2,744,824

RUMINANT FEED FROM COTTON GIN WASTE

Albert Lent, Tucson, Ariz., assignor to Erly-Fat Livestock Feed Co., a corporation of Arizona No Drawing. Application November 24, 1952,
Serial No. 322,333

4 Claims. (Cl. 99—6)

This invention relates to the art of animal feeds, and, more particularly, relates to a feed for ruminant animals such as cattle, sheep and goats, and a method of making such feed.

Attempts have been made in the past to utilize cotton gin waste as a feed for ruminant animals, but without success. Cotton gin waste, as the term is used herein, refers to the waste products from cotton ginning, and includes unopened cotton bolls, immature bolls, the outer covering of cotton bolls, some leaves and stems of cotton plants, and some lint and other foreign matter in or adhering to the balance of the waste as a natural result of the ginning operation. Such cotton gin waste is sometimes known as "gin trash" or "gin pin trash." It has been heretofore a practically worthless by-product of cotton ginning, and has been ordinarily disposed of by burning. It has little weight per unit of bulk, is unpalatable to animals, is largely cellulose and as such is substantially indigestible to animals, and has generally been regarded as unfit for use as an animal feed.

A primary object of the present invention is to provide a feed for ruminant animals which utilizes as its principal ingredient cotton gin waste hitherto believed to be useless for such purpose. I have discovered that such waste when properly prepared for use as a feed is comparable in feed quality with expensive grains, and is far cheaper than anything hitherto proposed.

In general, my invention consists in providing as an animal feed a mixture of finely ground cotton gin waste and a substantial proportion of molasses. Preferably, I compress the resulting mixture into pellet form, and this is an important feature of the invention.

In the practice of the invention, the cotton gin waste is first ground in a hammer mill or other suitable grinding device over a screen having a mesh approximately ⅜ inch. The finely ground waste passing through the screen is very light, spongy, porous, and very absorbent, and in such state is too bulky to be handled economically. It is then mixed with liquid molasses, preferably before it leaves the mill or grinding device so as to reduce the difficulty of handling it in its finely ground state. The finely ground waste will absorb only enough molasses to provide a maximum of about 50% of the resulting mixture by weight. An excess of molasses over that which can be readily absorbed by the waste does not materially improve the effectiveness of the waste as a feed material, as will be pointed out in more detail hereinafter, and, consequently, I prefer to limit the maximum amount of molasses to be used to such percentage. If the minimum percentage of molasses in the resulting mixture is less than about 25% by weight, there is insufficient molasses therein to adequately wet the cotton gin waste and the feeding quality of the mixture falls off rapidly below such minimum percentage. Consequently, I prefer to limit the percentage of molasses in the resulting mixture to between 25% and 50% thereof by weight.

After the finely ground cotton gin waste and the molasses are mixed, as just described, the mixture can be employed as a bulk feed. However, it is bulky and somewhat difficult to handle and I prefer to compress it into pellet form to reduce the bulk and make it more economical to transport and store. Such pelleting can be done in a conventional pellet machine, the molasses acting as a suitable binder for the resulting pellets. Although the size and shape of the pellets are relatively unimportant, I have obtained good results with pellets in the conventional cylindrical shape, being about 1½ inches in diameter and the same length. As so formed, they are quite hard and can be readily handled with a minimum of breakage and other loss. I have also used satisfactorily pellets of ½, ¾, and 1 inch in diameter.

As so pelleted, the mixture may be used as a grain substitute in any standard animal ration. In one experiment, equivalent feeder lambs were divided into two groups, A and B. Group A was fed upon the following standard feed ration:

|  | Percent |
|---|---|
| Rolled barley | 54.5 |
| Hay | 41.8 |
| Concentrate | 3.7 |
| Total | 100.0 |

Group B was fed upon the following ration, using the pelleted feed of my invention containing 50% finely ground cotton gin waste and 50% molasses:

*Cotton gin waste—molasses*

|  | Percent |
|---|---|
| Pellets | 52.2 |
| Hay | 44.0 |
| Concentrate | 3.8 |
| Total | 100.0 |

The lambs in Group A of the foregoing experiment ate 844 pounds of the above feed per 100 pounds gained in animal weight for an average gain per animal of 0.32 pound per day, whereas the lambs in Group B ate 860 pounds of the above feed per 100 pounds gained in animal weight for an average gain per animal of 0.37 pound per day. It will thus be understood that by substituting the feed of my present invention for conventional rolled barley slightly better weight gains were made than with the rolled barley feed. It is to be noted that rolled barley has long been considered by cattle and sheep feeders as one of the best grains for feeding ruminants. The cost of the feed of my invention is, of course, only a fraction of that of rolled barley and other equivalent feed grains.

The food value to ruminants of the feed of this invention was additionally demonstrated by a further experiment which included a series of digestion tests on both cattle and sheep. In such tests, my feed was pelleted from a mixture of finely ground cotton gin waste and molasses, in which there was 30% molasses by weight. This mixture contained four calories per gram, or 1,816 calories per pound, which is about equivalent to corn or sorghums and is higher than oats or barley. This feed was digested by cattle and sheep in the trials as follows:

|  | Trial #1 | Trial #2 | Trial #3 |
|---|---|---|---|
|  | Percent | Percent | Percent |
| Cattle | 40.8 | 41.5 | 40.0 |
| Sheep | 41.4 | 43.7 | 38.8 |

The foregoing tests resulted in a food value, expressed in terms of therms net energy of 75.1 for sheep and 74.0 for cattle, which is directly comparable with the food value to cattle of other materials fed conventionally, expressed in similar terms as follows:

| | |
|---|---|
| Milo maize | 75.2 |
| Barley (heavy) | 74.6 |
| Barley (ordinary) | 70.5 |
| Alfalfa hay | 41.5 |
| Barley hay | 40.6 |
| Cottonseed hulls | 40.6 |

Of the materials in the foregoing table, milo maize, barley (heavy), and barley (ordinary) are classed as concentrates, and alfalfa hay, barley hay, and cottonseed hulls are classed as roughages. Thus, it will be understood that the new feed of my invention is comparable with and equivalent to standard concentrates, and is not a roughage.

It also provides such a feed from cotton gin waste, a hitherto worthless product. It is my belief that when such waste is processed and mixed with molasses, as described above, the product becomes essentially a concentrated carbohydrate feed and is used as such by the animal, instead of merely an indigestible roughage of questionable value.

The valuable results accuring from the use of my invention may be attributed, I believe, to the nature of the digestion of ruminants. Ruminants have a rumen, or paunch, which may be considered merely as a first container into which all of the food which the animal eats first enters its digestive system, although substantially no digestive juices or enzymes are added in the rumen. The principal action taking place in the rumen is a fermentation, accomplished by the action of microorganisms already there. Such micro-organisms consist chiefly of protozoa, bacteria, yeast, moulds, and other types of microflora. They make up ten per cent or more of the dry matter of the rumen contents, or may be few in numbers if proper nutrients for their development are lacking. With moisture and warm temperature and supplied with proper nutrients in the rumen, such micro-organisms multiply rapidly in numbers, as many as six generations daily. I believe that when available in large numbers they work directly upon the celluloses and hemicelluloses such as make up the major part of cotton gin waste, multiplying and maturing thereon, and are then themselves digested and used as food by the animal. The more porous the material to be digested, the more efficient is the action of the microflora thereon, and thus it is essential for the utilization of cotton gin waste as a feed that it be finely ground to enable the microflora to fully penetrate it, the resulting fermentation releasing the nutrients upon which the microflora live and multiply.

The molasses in my feed has several functions. First, it provides a mechanical binder to permit the finely ground cotton gin waste to be effectively pelleted. Secondly, it renders the waste palatable as a feed. Lastly, and most important, it promotes the growth and expansion of the microflora to all parts of the waste, thus facilitating their action thereon. If an insufficient amount of molasses is employed to wet substantially all parts of the cotton gin waste, the microflora do not spread effectively to the unwetted portions, and such portions are not fermented by the microflora to convert them into the complex carbohydrates and other materials that can be digested by the animal. On the other hand, an excess of molasses above the quantity that can be absorbed by the waste does not materially increase the rate of multiplication of the microflora or their action on the waste, and thus there is a practical limit to the amount of molasses that can be effectively employed. While I believe that the foregoing is the correct theory of operation of my new feed material, the fact is that my feed has been demonstrated to be digested by ruminant animals and is not a mere roughage material. Furthermore, feeding tests have plainly shown that the feed of my present invention is equal or superior to conventional grains in feeding qualities.

I claim as my invention:

1. A grain-substitute feed for ruminant animals, including: approximately 50% to 75% by weight of finely ground cotton gin waste of a size that will pass through a screen having a mesh of approximately 3/8 inch; and approximately 50% to 25% by weight of molasses, the same being intimately mixed with the cotton gin waste.

2. A grain-substitute feed for ruminant animals, including: approximately 50% to 75% by weight of finely ground cotton gin waste of a size that will pass through a screen having a mesh of approximately 3/8 inch; and approximately 50% to 25% by weight of molasses, the same being intimately mixed with the cotton gin waste and compressed into individual pellets.

3. A method of making a feed for ruminant animals, including: finely grinding cotton gin waste to a size that will pass through a screen having a mesh of approximately 3/8 inch; intimately mixing molasses with said cotton gin waste to form a mixture containing approximately 50% to 75% by weight of such cotton gin waste and approximately 50% to 25% by weight of said molasses; and compressing said mixture into discrete pellets.

4. A method of making a feed for ruminant animals, including finely grinding cotton gin waste to a size that will pass through a screen having a mesh of approximately 3/8 inch; and intimately mixing molasses with said cotton gin waste to form a mixture containing approximately 50% to 75% by weight of such cotton gin waste and approximately 50% to 25% by weight of said molasses.

References Cited in the file of this patent

UNITED STATES PATENTS

| | | |
|---|---|---|
| 1,638,963 | Schreiber | Aug. 16, 1927 |

FOREIGN PATENTS

| | | |
|---|---|---|
| 6,931 | Great Britain | 1901 |